(12) United States Patent
Zakharov

(10) Patent No.: US 12,124,798 B2
(45) Date of Patent: Oct. 22, 2024

(54) METHOD AND SYSTEM FOR OBTAINING SIMILARITY RATES BETWEEN ELECTRONIC DOCUMENTS

(71) Applicant: Kyocera Document Solutions Inc., Osaka (JP)

(72) Inventor: Oleg Y. Zakharov, Walnut Creek, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 352 days.

(21) Appl. No.: 17/460,601

(22) Filed: Aug. 30, 2021

(65) Prior Publication Data

US 2023/0080508 A1    Mar. 16, 2023

(51) Int. Cl.
   *G06F 40/194* (2020.01)
   *G06F 40/279* (2020.01)

(52) U.S. Cl.
   CPC .......... *G06F 40/194* (2020.01); *G06F 40/279* (2020.01)

(58) Field of Classification Search
   None
   See application file for complete search history.

(56) References Cited

U.S. PATENT DOCUMENTS

| | | | | |
|---|---|---|---|---|
| 5,418,951 A | * | 5/1995 | Damashek | G06F 16/355 |
| | | | | 707/999.005 |
| 9,235,624 B2 | * | 1/2016 | Zhou | G06F 16/24558 |
| 9,633,085 B2 | * | 4/2017 | Kamotsky | G06F 16/951 |
| 9,659,013 B2 | * | 5/2017 | Wade | G06V 30/224 |
| 2003/0065658 A1 | | 4/2003 | Matsubayashi et al. | |
| 2012/0095993 A1 | * | 4/2012 | Shau | G06F 16/334 |
| | | | | 707/723 |
| 2016/0239487 A1 | * | 8/2016 | Potharaju | G06F 16/24578 |
| 2018/0324198 A1 | * | 11/2018 | Borthakur | H04L 63/1425 |
| 2019/0318009 A1 | * | 10/2019 | Miller | G06F 16/248 |

(Continued)

OTHER PUBLICATIONS

Maria Soledad Pera and Yiu-Kai Ng "SimP aD: A Word-Similarity Sentence-Based Plagiarism Detection Tool on Web Documents" Web Intelligence and Agent Systems: An International Journal 0 (2009) 1-0. Retrieved from https://students.cs.byu.edu/~ng/papers/wias-revised.pdf (Year: 2009).*

(Continued)

*Primary Examiner* — Richemond Dorvil
*Assistant Examiner* — Alexander G Marlow
(74) *Attorney, Agent, or Firm* — Millen, White, Zelano & Branigan P.C.; William F. Nixon

(57) ABSTRACT

A method is disclosed for calculating similarity rates between electronic documents. The similarity rate is calculated based on a count of matching phrases between the electronic documents and distances between subsequent matching phrases in each of the electronic documents. A system is also disclosed for comparing the electronic documents to obtain their similarity rates. A computing device determines at least one first proximity parameter based on the number of matched words in a matching phrase and at least one second proximity parameter based on distances between the subsequent matching phrases in each of the electronic documents. The similarity rate is determined based on the first and second proximity parameters.

17 Claims, 6 Drawing Sheets

(56) References Cited

U.S. PATENT DOCUMENTS

2021/0240737 A1\* 8/2021 Fox .................... G06F 16/2468

OTHER PUBLICATIONS

Ivan Boban, Alen Doko, Sven Gotovac "Improving Sentence Retrieval Using Sequence Similarity" Natural Language Processing: Emerging Neural Approaches and Applications. Retrieved from https://www.mdpi.com/2076-3417/10/12/4316 (Year: 2020).\*
Wikipedia—TF-IDF (theory of 'term frequency' and 'inverse document frequency') https://en.wikipedia.org/wiki/Tf%E2%80%93idf.
P. Taylor et al., "Proximity Coefficients as a Measure of Interrelationships in Sequences of Behavior", Behavior Research Methods, vol. 38 (2006) pp. 42-50.

\* cited by examiner

METHOD AND SYSTEM FOR OBTAINING SIMILARITY RATES BETWEEN ELECTRONIC DOCUMENTS

FIELD OF THE INVENTION

The present invention relates to a method and system for obtaining a similarity rate of an electronic document in relation to a primary electronic document. More particularly, the present invention relates to a method and system for searching electronic documents based on their similarity rates.

DESCRIPTION OF THE RELATED ART

Enterprise Content Management (ECM) and Document Management (DMS) systems are known methods for searching documents using key-words or exact phrases with additional criteria such as a Boolean operations and proximity. But in some case the user wants to search documents by similarity between documents. It includes similarity by semantic meaning, phrases and parts of the text. Some technologies like TF-ID may search documents based on a measurement of word/term frequency occurred in a document. The frequency of words occurrence, however, doesn't always reflect meanings of texts in the document linguistically and semantically.

Thus, there is a need for searching documents based on other factors, such as similarity rates between documents.

SUMMARY OF THE INVENTION

A method for obtaining similarity rates between electronic documents using a computing device is disclosed. The method comprises using a first electronic document as a reference document and comparing the first document with a second electronic document, counting a number of matching phrases between the first and the second electronic documents, measuring distances between subsequent matching phrases in each of the first electronic document and the second electronic document; and obtaining a similarity rate between the first electronic document and the second electronic document based on the number of matching phrases and the measured distances. In accordance with the disclosed embodiments, the matching phrases include exactly-matched phrases and similarly-matched phrases, and wherein the similarly-match phrases have the same lengths and include at last one matched word.

In obtaining the similarity rate, the method further comprises obtaining first proximity parameters, each of which corresponds to one of the matching phrases between the first and second electronic documents, and each of the first proximity parameters being determined by a number of matched words within each of the matching phrases, obtaining at least one second proximity parameter based on the measured distances of the matching phrases in the first and the second electronic documents, and obtaining the similarity rate by multiplying each of the first proximity parameters and a length of each of the matching phrases, plus the at least one second proximity parameter.

A system for obtaining similarity rates between electronic documents is also disclosed. The system comprises an input device for receiving a reference electronic document and at least one electronic document to be compared with the reference electronic document, and a processing device for comparing the at least one electronic document to the reference electronic document to obtain a similarity rate. The similarity rate is obtained by counting matching phrases between the reference electronic document and the at least one electronic document, and by comparing distances between the matching phrases in the reference electronic document and in the at least one electronic document. The system further comprises an output device for outputting the at least one electronic document if the similarity rate of the at least one electronic document in relation to the reference electronic documents meets a predetermined range.

The processing device in accordance with the disclosed embodiments further comprises a counting component for counting a number of the matching phrases between the reference electronic document and the at least one electronic document, wherein the matching phrases include exactly-matched phrases and similarly-matched phrases, and wherein the similarly-matched phrases have a same length and include at last one matched word, a distance calculating component for measuring the distances between subsequent matching phrases in the reference electronic document and in the at least one electronic document. The processing device further comprises a first proximity parameter calculating component for obtaining at least one first proximity parameter of the matching phrases of the at least one electronic document, wherein each of the at least one first proximity parameters corresponds to one of the matching phrases, and wherein each of the first proximity parameters is determined by a number of matched words within each of the matching phrases, and a second coefficient calculating component for obtaining second proximity parameters, each of which is calculated based on the distances between subsequent matching phrases in the reference electronic document and in the at least one electronic document measured by the distance calculating component, and a similarity rate calculating component for obtaining the similarity rate of the at least one electronic document in relation to the reference electronic document, wherein the similarity rate is calculated by multiplying each of the first proximity parameters and a corresponding length of each of the matching phrases, plus the second proximity coefficients.

A method for obtaining electronic documents, using a computing device, that is similar to a reference electronic document is further disclosed. The method comprises receiving the reference electronic document, and receiving user instructions from a user interface, wherein the user instructions include searching electronic documents stored in a database and outputting certain electronic documents that have similarity rates falling within a predetermined range in relation to the reference electronic document. The method further compares the reference electronic document with the electronic documents stored in the database, counts a number of matching phrases between the reference electronic document and each of the stored electronic documents, measures distances between subsequent matching phrases in each of the stored electronic documents that have at least one matching phrase with the reference electronic document and the reference electronic document, calculates similarity rates of each of the stored electronic documents that have at least one matching phrase based on the number of matching phrases and the measured distances, and outputs the certain electronic documents of which the similarity rate in relation to the reference electronic document fall within the predetermined range. The matching phrases include exactly-matched phrases and similarly-matched phrases, and the similarly-match phrases have a same length and include at last one matched word.

In accordance with the disclosed embodiments, each of the first proximity parameters is determined by a percentage of the matched words within the matching phrases and the at least one second proximity parameter is obtained by a ratio of the measured distance between the matching phrases of the first electronic document and the measured distance between the matching phrases of the second electronic document.

In some cases, the matching phrases include one or more group of matching phrases. Each of the one or more groups may have a same or a different length. In these cases, the method in accordance with the disclosed embodiments further comprises calculating a similarity rate for each group respectively and summing up the similarity rate of each group to obtain a total similarity rate.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The preferred embodiments of the present invention measures similarity rates based on the number of matching phrases and proximity parameters between two electronic documents. In accordance with the disclosed embodiments, measuring the similarity rates facilitates a user to search documents stored in a database that are similar to a primary electronic document (or reference electronic document) in a faster and more accurate way. The measurement of the similarity rates is particularly useful with a search engine for searching similar documents.

Conventionally, when conducting a document search, the user may enter keywords or exact phrases with a Boolean operation. The result comes in a format of a list with references to individual documents, or search results. The total number of documents after an initial search can be as large as tens of thousands of electronic documents, sometimes over dozens of pages to be reviewed by the user. This process is cumbersome and not very effective.

The disclosed embodiments compare two documents by counting the number of matching phrases and analyzing each pair of matching phrases to obtain proximity parameters based on their sematic meanings and similar text and phrases sequences. By measuring the similarity rates between different electronic documents, the disclosed embodiments are able to search documents that have similar texts, phrases, and semantic meanings by analyzing the matching phrases and obtaining proximity parameters of the matching phrases. Thus, the search result can be more accurate and less cumbersome in the respect for the user.

Figure 1:
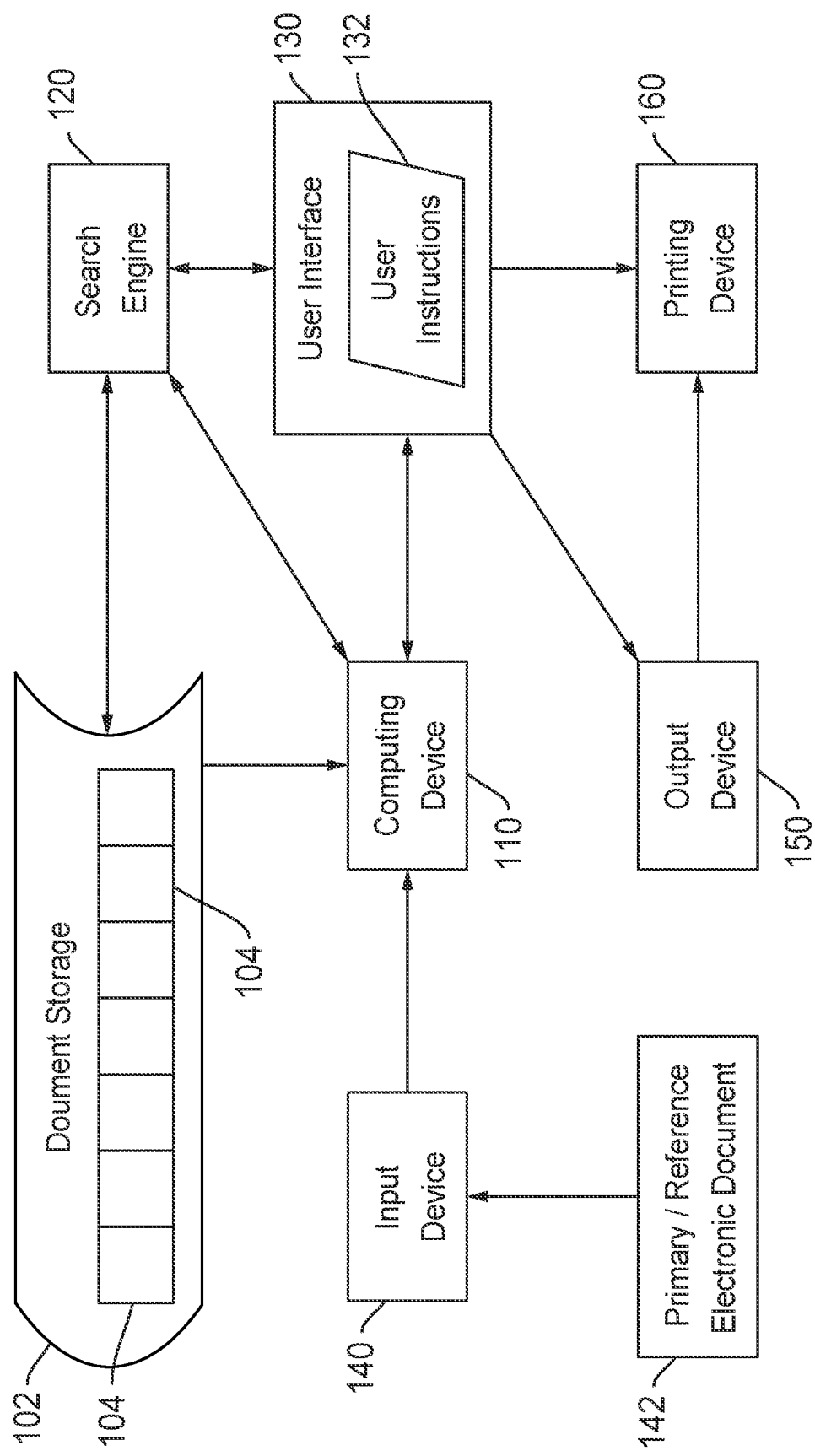
FIG. 1 illustrates a block diagram of a searching management system according to the disclosed embodiments.

FIG. 1 illustrates a block diagram of a search management system 100 according to the disclosed embodiments. Search management system 100 includes a searchable document storage 102. Document storage 102 includes electronic documents 104. In some embodiments, document storage 102 may store thousands of electronic documents 104. Electronic documents 104 may have their unique features, such as semantic meanings, text fields, or phrase sequences. The disclosed embodiments compare the unique features of electronic documents 104 to obtain similarity rates with each other.

Search management system 100 also includes computing device 110 that interacts with search engine 120 and user interface 130 to conduct similarity rate calculations and to search electronic documents 104 based on their similarity rates in relation to reference electronic document 142. Reference electronic document 142 may be received at input device 140 and be inputted to computing device 110 as a primary electronic document for comparison. Input device 140 may also receive instructions from user interface 130. In some embodiments, input device 140 may be a general term of a combination of an input device and a user interface. In accordance with the disclosed embodiments, reference electronic document 142 may be a scanned electronic document sent from a scanner/printing device, which may be same type as scanner/printing device 160 or a different scanner/printing device, or an electronic document stored in a database that may be or may not be document storage 102, selected by a user as a reference electronic document for comparison.

Search engine 120 also interacts with user interface 130 to search documents based on user instructions 132 received from the user through user interface 130. User instructions 132 may include searching documents with search criteria, such as key-words, exact phrases, similarity rate range in relation to reference electronic document 142, changing searching criteria, selecting documents for review, outputting selected documents and so on. The disclosed embodiments will focus on desired similarity rate or desired similarity rate range, as described below with FIGS. 2-5.

Computing device 110, after receiving user instructions 132 from user interface 130, works in conjunction with search engine 120 to retrieve electronic documents 104 from database 102. Computing device 110 then compares each electronic document 104 with reference electronic document 142 and obtains a similarity rate of each electronic document 104 in relation to reference electronic document 142. Computing device 110 may also decide if the obtained similarity rate meets the search criteria set by the user, such as a desired similarity rate or a desired similarity rate range. Electronic documents of which the similarity rates meet the user's search criteria will be sent to output device 150.

Output device 150 may be a display screen that displays a list of electronic documents having desired similarity rates as required by user prompt instructions 132. Based on received user instructions, output device 150 may also display a full image of one or more electronic documents from the list for the user's review. Further, based on user instructions, output device 150 may send selected documents to printing device 160 to be printed out.

Printing device 160 may be any multi-functional printing device or image forming apparatus that performs various functions, such as printing, scanning, storing, copying, and the like. Printing device 120 also may refer to a scanner or device implement optical character recognition to capture data about documents corresponding to electronic documents 104.

Figure 2:
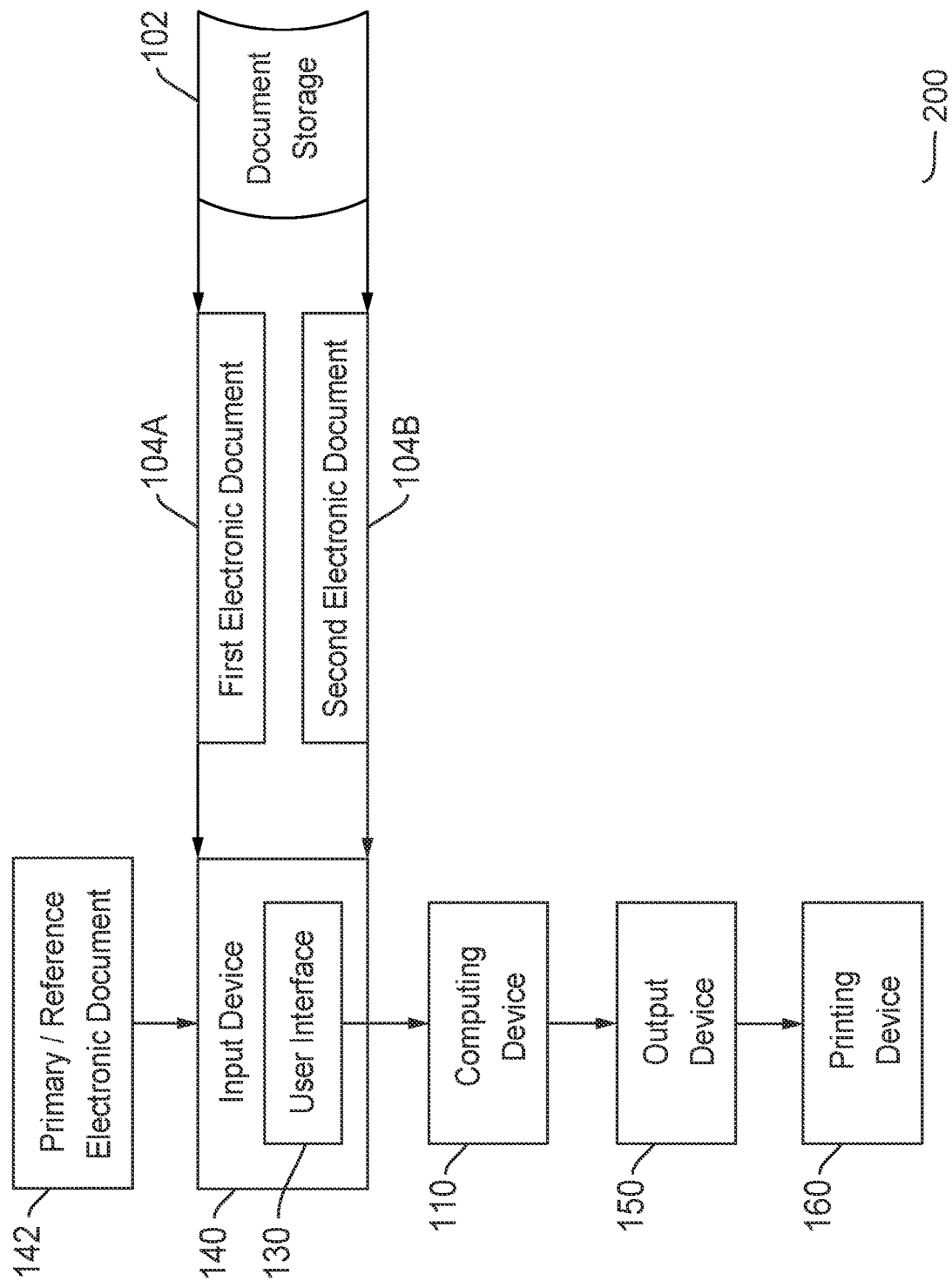
FIG. 2 illustrates a block diagram of a similarity rate calculating system for obtaining a similarity rate between two documents according to the disclosed embodiments.

FIG. 2 depicts a similarity rate calculating system 200 in accordance with the disclosed embodiments. To prevent confusion, the same reference numbers of FIG. 1 are designated to similar devices in FIG. 2. Similarity rate calculating system 200 is adapted to determine a similarity rate between two electronic documents. Preferably, system 200 determines similarity rates of multiple electronic documents in relation to a primary electronic document, such as reference electronic document 142.

Similarity rate calculating system 200 includes input device 140 for receiving reference electronic document 142 and first electronic document 104 retrieved from document storage 102. In the preferred embodiments of FIG. 2, input device 140 may include user interface 130 that allows a user to communicate with system 200 and to enter instructions. The user instructions may include comparing reference electronic document 142 with electronic documents stored in document storage 102 that includes first electronic document 104A and second electronic document 104B, outputting certain electronic documents of which their similarity rates in relation to reference electronic document 142 meets a predetermined range, printing those certain electronic documents, and so on. When a comparison instruction is received at input device 140, system 200 retrieves first electronic document 104A from document storage 102 and sends document 104A to input device 140.

Computing device 110 may be a CPU (Central Processing Unit) for executing instructions received from input device 140. In this instance, computing device 110 compares reference electronic document 142 and first electronic document 104A by extracting features detected in electronic documents 142 and 104A. In accordance with the disclosed embodiments, the features may include the number of matching phrases, sematic meanings of texts, sequences of phrases, and distances between subsequent matching phrases contained in documents 142 and 104A. Computing device 110 analyzes the extracted features to determine their similarity rate.

Output device 150 may be a display screen that displays first electronic document 104A if the similarity rate of the first electronic document 104A meets a predetermined range. It is known that a computer screen may functions as an input screen as well as an output screen. Thus, input device 140 and output device 150 may be combined as an input/output device (I/O device). The following descriptions will describe these devices separately for illustrative purposes.

In the disclosed embodiments, first electronic document 104A may be sent to printing device 160 for being printed out based on the user instructions. Computing device 110 may continue comparing the next electronic document retrieved from document storage 102, such as second electronic document 104B and obtaining a similarity rate of second electronic document 104B in relation to reference electronic document 142. The comparing process will continue until all stored documents are compared, or a required number or required categories of stored documents are compared. In preferred embodiments, as there are thousands of documents stored in document storage 102, the user may enter instructions including keywords, document categories, exact matching phrases, number of pages, a first page, business documents such as accounting, invoices, and legal document, etc., together with Boolean operation, to limit the number of electronic documents to be compared and to reduce the processing time.

In alternative embodiments, first and second electronic documents 104A and 104B may be sent from a local computer or a scanner/printing device or from a remote device via an internet network (not shown). For example, first electronic document 104A may be a scanned document received from printing device 160 (FIG. 1).

Figure 3:
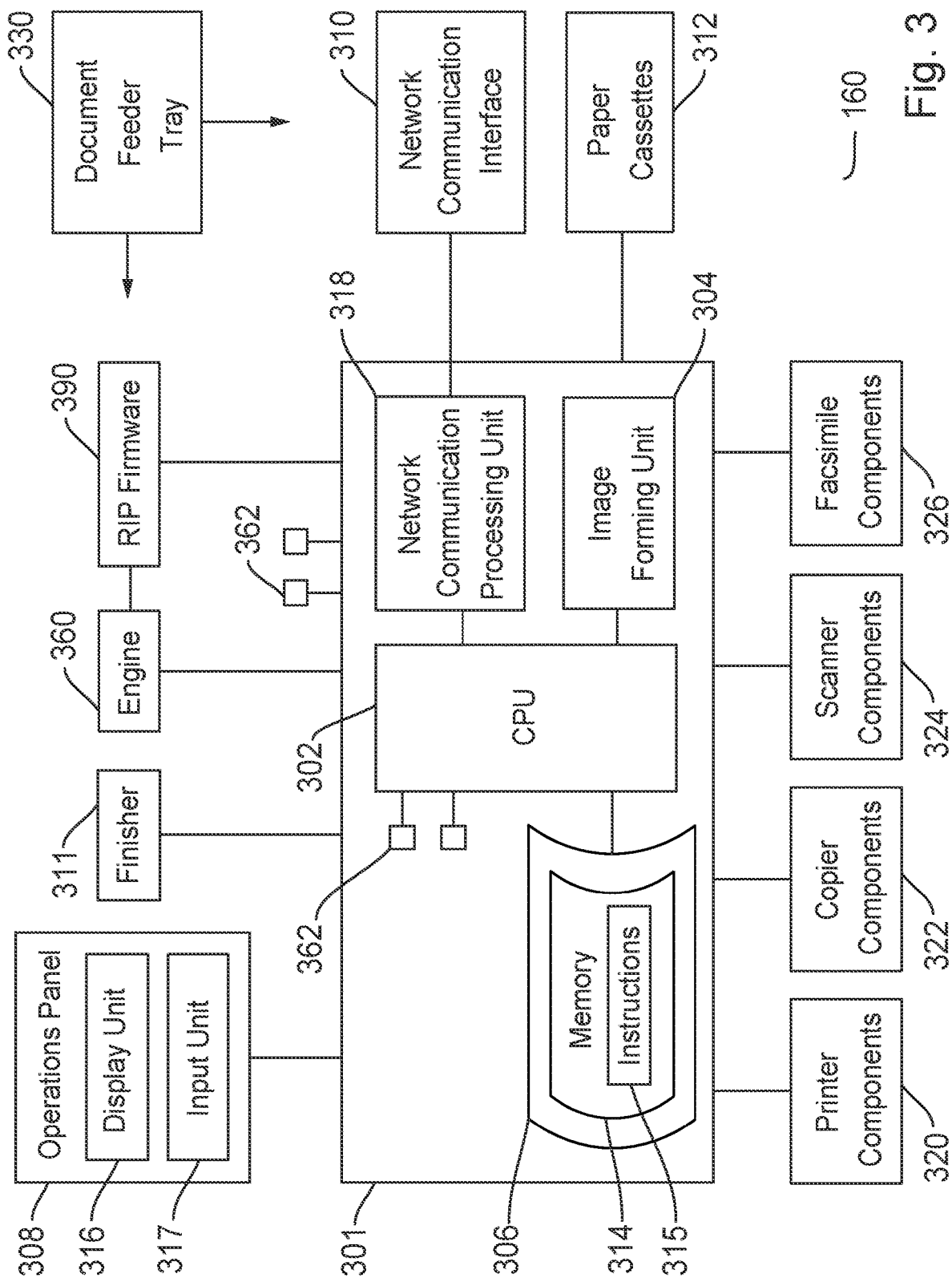
FIG. 3 illustrates a block diagram of a multi-functional printing device that is used for sending scanning documents and printing documents according to the disclosed embodiments.

Printing device 160 may be referred to by the disclosure of FIG. 3 for illustrative purposes. The architecture shown in FIG. 3 may apply to any multi-functional printing device or image forming apparatus that performs various functions, such as printing, scanning, storing, copying, and the like within systems 100 and 200. As disclosed above, printing device 160 may send and receive data from input device 140 and user interface and other devices within systems 100 and 200.

As illustrated in FIG. 3, printing device 160 includes a computing platform 301 that performs operations to support these functions. Computing platform 301 includes a computer processing unit (CPU) 302, an image forming unit 304, a memory unit 306, and a network communication processing unit 318. Other components may be included but are not shown for brevity. Printing device 160, using computing platform 301, may be configured to perform various operations, such as scanning, copying, printing, receiving or sending a facsimile, or document processing. As such, printing device 160 may be a printing device or a multi-function peripheral including a scanner, and one or more functions of a copier, a facsimile device, and a printer. To provide these functions, printing device 160 includes printer components 320 to perform printing operations, copier components 322 to perform copying operations, scanner components 324 to perform scanning operations, and facsimile components 326 to receive and send facsimile documents. CPU 302 may issue instructions to these components to perform the desired operations.

Printing device 160 also includes a finisher 311 and one or more paper cassettes 312. Finisher 311 also may perform additional actions, such as sorting the finished papers, binding sheets of papers with staples, doubling, creasing, punching holes, folding, and the like. Paper cassettes 312 supply paper to various components 320, 322, 324, and 326 to create the image formed surfaces on the papers.

Document feeder tray 330 may be the physical components of printing device 160 to receive papers and documents to be processed. A document is placed on or in document processor input feeder tray 330, which moves the document to other components within printing device 160. The movement of the document from document processor input feeder tray 330 may be controlled by the instructions input by the user. As shown in FIG. 3, document processor input feeder tray 330 may interact with engine 360 to perform the desired operations.

Memory unit 306 includes memory 314 to store instructions 315. Instructions 315 are executable on CPU 302 or other processors associated with printing device 160, such as any processors within components 320, 322, 324, or 326. Memory unit 306 also may store information for various programs and applications, as well as data specific to printing device 160.

Computing platform 301 may host one or more processors, such as CPU 302. These processors are capable of executing instructions 315 stored at one or more storage locations 314. By executing these instructions, the processors cause printing device 160 to perform various operations. The processors also may incorporate processing units for specific purposes, such as application-specific integrated circuits (ASICs) and field programmable gate arrays (FPGAs). Other processors may be included for executing operations particular to components 320, 322, 324, and 326. In other words, the particular processors may cause printing device 160 to act as a printer, copier, scanner, and a facsimile device.

Printing device 160 also includes an operations panel 308, which may be connected to computing platform 301. Operations panel 408 may include a display unit 316 and an input unit 317 for facilitating interaction with a user to provide commands to printing device 160.

Printing device 160 also includes network communication processing unit 318. Network communication processing unit 318 may establish a network communication using network communication interface 310, such as a wireless or wired connection with one or more other image forming apparatuses or network service. CPU 302 may instruct network communication processing unit 318 to transmit or retrieve information over a network using network communication interface 310. As data is received at computing platform 301 over a network, network communication processing unit 318 decodes the incoming packets and delivers them to CPU 302. CPU 302 may act accordingly by causing operations to occur on printing device 160. CPU 302 also may retrieve information stored in memory unit 306, such as settings for printing device 160.

Printing device 160 also includes engine 360. Engine 360 may be a combination of hardware, firmware, or software components that act accordingly to accomplish a task. For example, engine 360 is comprised of the components and software to print a document. It may receive instructions from computing platform 301 after user input via operations panel 308. Alternatively, engine 360 may receive instructions from other attached or linked devices.

Engine 360 manages and operates the low-level mechanism of the printing device engine, such as hardware components that actuate placement of toner onto paper. Raster image processor (RIP) firmware 390 that interprets the page description languages (PDLs) would transmit and send instructions down to the lower-level engine 360 for actual rendering of an image and application of the toner onto paper during operations on printing device 160.

Printing device 160 may include one or more sensors 362 that collect data and information to provide to computing platform 301 or CPU 302. Each sensor 362 may be used to monitor certain operating conditions of printing device 160. Sensors 362 may be used to indicate a location of a paper jam, failure of hardware or software components, broken parts, operating system problems, document miss-feed, toner level, as well as other operating conditions. Sensors 362 also may detect the number of pages printed or processed by printing device 160. When a sensor 362 detects an operational issue or failure event, it may send a signal to CPU 302. CPU 302 may generate an error alert associated with the problem. The error alert may include an error code.

In some embodiments, printing device 160 communicates with user interface 130 through REST API, which allows the server to collect data from multiple devices within content management system 100. REST API and SOAP are application protocols used to submit data in different formats, such as files, XML messages, JSON messages, and the like. By utilizing applicable network communication protocols and application protocols, printing device 160 submits and receives data from user interface 130 and computing device 110.

Figure 4:
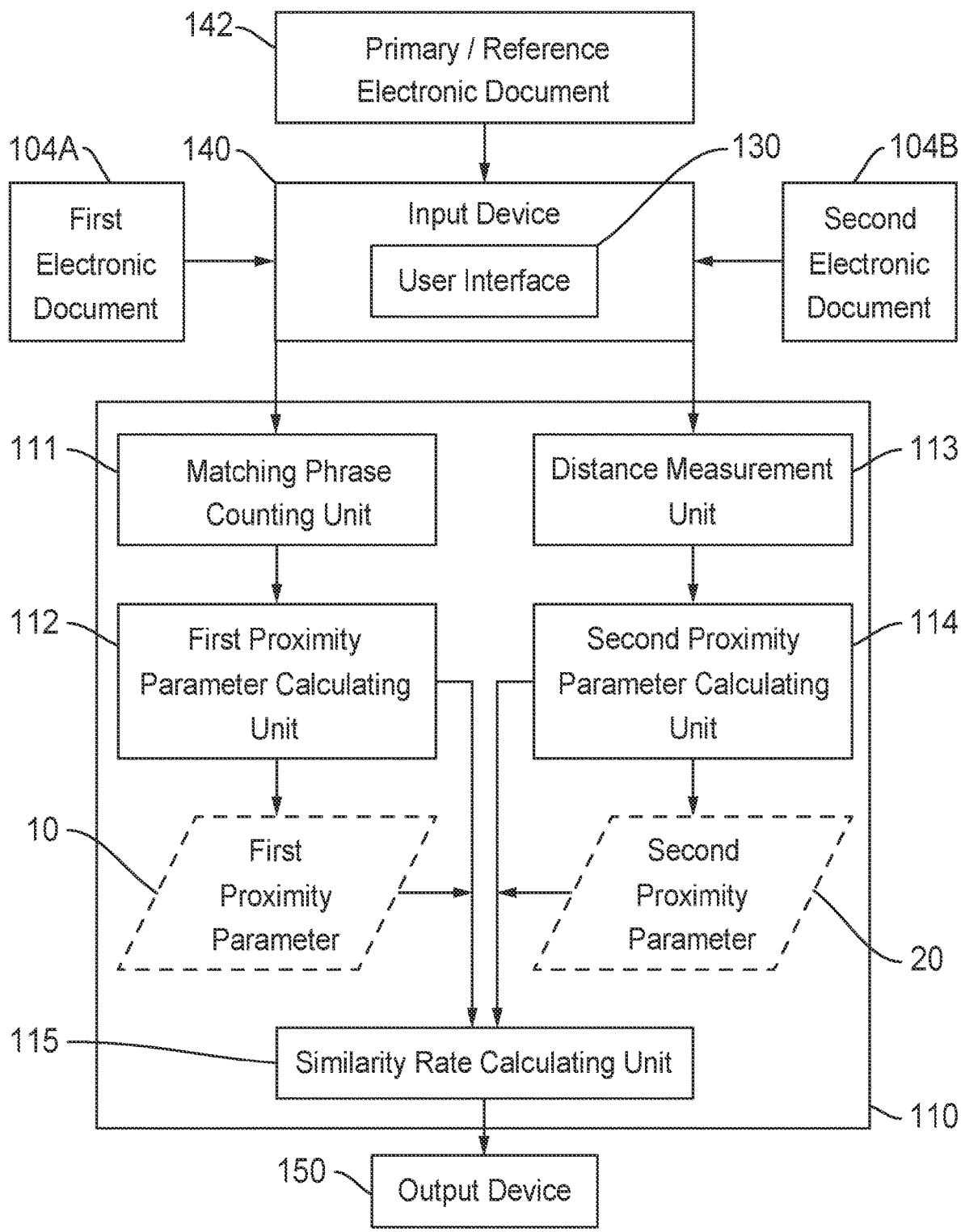
FIG. 4 illustrates a block diagram of a similarity rate calculating system showing a computing device is used to compare two documents to obtain a similarity rate between the two documents according to the disclosed embodiments.

FIG. 4 illustrates a block diagram of similarity rate calculating system 200 in which computing device 110 is shown in more details. FIG. 4 will be incorporated here in accompany with FIGS. 2 and 5 to provide a better understanding of the disclosed embodiments. As shown in FIG. 4, input device 140 receives reference electronic document 142 and first electronic document 104A and sends these two documents to computing device 110 for processing. In the disclosed embodiments, computing device 110 processes documents 142 and 104A to determine a similarity rate of first electronic document 104A in relation to reference electronic document 142. Input device 140 may also receive more electronic documents (not shown) if there are more than one electronic document to be compared. Computing device 110 may compare these electronic documents one by one or at the same time based on the capability thereof. For the purpose of brevity, FIG. 4 only shows first and second electronic documents 104A and 104B to be compared with reference electronic document 142.

Computing device 110 includes matching phrase counting unit 111, first proximity parameter calculating unit 112, distance measurement unit 113, second proximity parameter calculating unit 114, and similarity rate calculating unit 115.

Matching phrases counting unit 111 is adapted to count the number of matching phrases between reference electronic document 142 and first electronic document 104A. The number of matching phrases may be one or more than one. If there is no matching phrase in first electronic document, the first electronic document will be discarded and computing device 110 compares next electronic document (e.g., second electronic document retrieved from document storage 102) inputted by input device 140. In accordance with the disclosed embodiments, the matching phrase may be an exact-matched phrase or a partial-matching phrase and the matching phrase may follow a same sequence as that in reference electronic document 142. Further, the matching phrase has a same length (i.e, same number of words in the phrase) as that in reference electronic document 142. In some cases, there may be more than one matching phrase. For example, there may be one matching phrase that has 10 words in length, and another matching phrase that has only 5 words in length. When more than one matching phrase are found, computing device 110 processes each matching phrase individually to determine a first proximity parameter 10 for each matching phrase and combines all first proximity parameters together at the end.

Further, according to the disclosed embodiments, as the lengths of compared electronic documents may be largely different, the count of matching phrases needs to be normalized based on the lengths of the documents. Otherwise, it will be difficult to compare a 1-page document with a 100-page document.

First proximity parameter calculating unit 112 determines first proximity parameter/parameters 10 based on the number of matching phrases in first electronic document 104. In the disclosed embodiments, the first proximity parameter/parameters 10 may be calculated based on the number of matching words in each pair of matching phrases between reference electronic document 142 and first electronic document 104A. For example, a pair of matching phrases between reference electronic document 142 and first electronic document 140A both have 10 words following a same sequence, except one word that does not match between the pair of matching phrases. Thus, for first electronic document 104A, first proximity parameter calculating unit 112 determines that first proximity parameter 10 of the matching phrase (in the pair of matching phrases) contained in first electronic document 104A will be counted as 0.9. First proximity parameter calculating unit 112 may determine more than one first proximity parameter if there are different pairs of matching phrases with more than one word unmatched. For example, if two words are unmatched from a 10-word-length matching phrase, the first proximity parameter 10 of this matching phrase will be 0.8. Further, when exact-matched phrases are found, the first proximity parameters 10 for these exact-matched phrases will be 1.

That is, the first proximity parameter 10 can be obtained by the following equation:

$$\text{First } prox. \text{ parameter} = \frac{\text{number of matched words in a matching phrase}}{\text{length of the matching phrase}} \quad (1)$$

Figure 5:
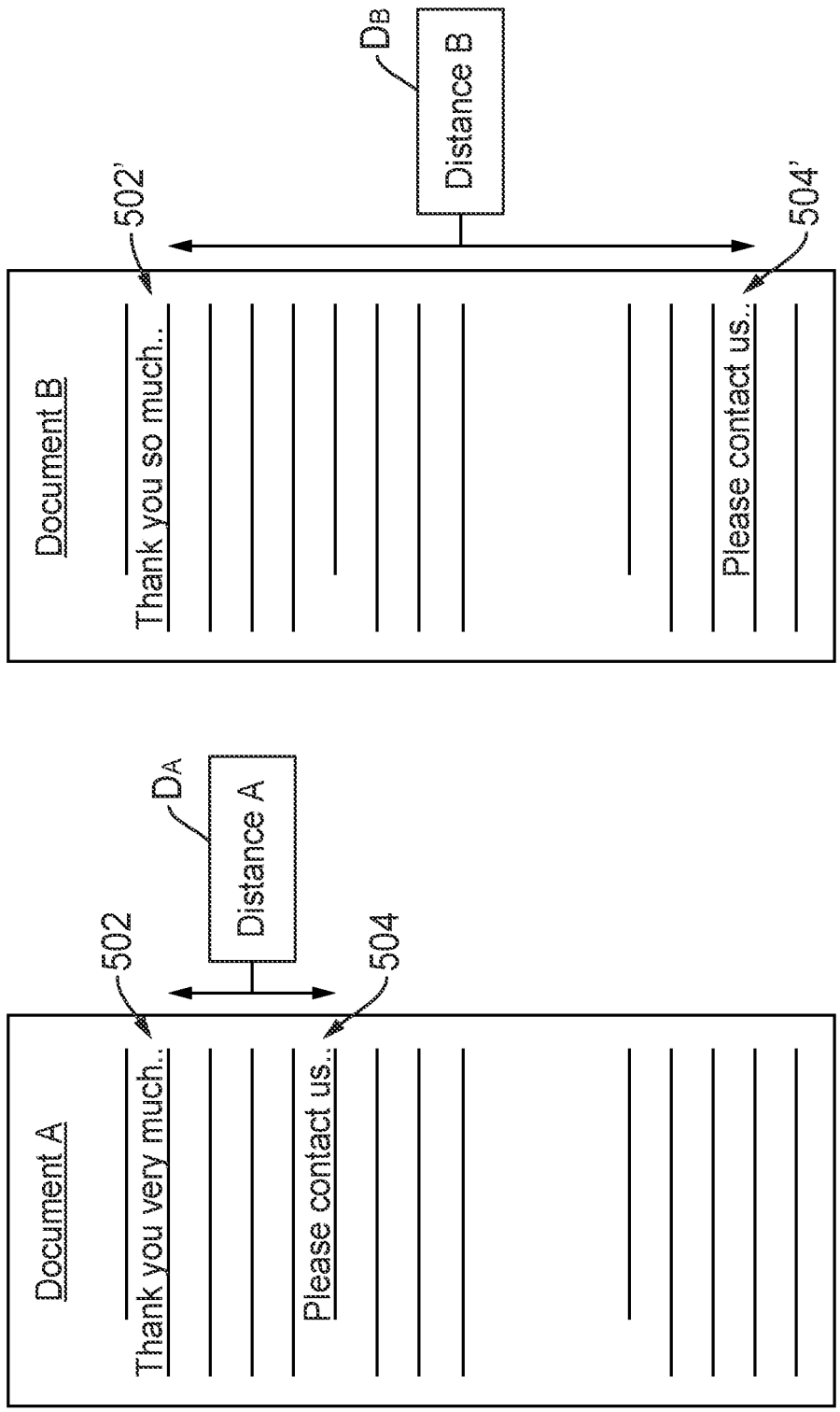
FIG. 5 illustrates two exemplary electronic documents that are compared by a similarity rate calculating system to obtain a similarity rate according to the disclosed embodiments.

FIG. 5 illustrates an example of comparing two electronic documents, i.e., document A and document B, in accordance with the preferred embodiments. In this example, document A may be reference electronic document 142 and document B may be first electronic document 104A shown in FIG. 5. As shown in FIG. 5, documents A and B have only two matching phrases 502-502' and 504-504'.

First pair of matching phrases 502 and 502' is shown, as follow:

Document A, Thank you very much
Document B, Thank you so much

Phrases "Thank you very much" 502 and "Thank you so much" 502' do not match exactly, but will have a close similarity rate because only one word out of four does not match. As there are three matched words in a pair of four-word matching sentences between document A and document B, the first proximity parameter for this pair of matching phrases 502-502' will be ¾=0.75. The first proximity parameters reflect both the number of missing words and the number of matched words.

In the same manner, the other pair of matching phrases 504-504' will have a first proximity parameter of 1 as the phrases "Please contact us" 504 and 504' in both documents A and B are exactly matched.

It is noted that the more the matching phrases are, the higher the similarity rate will be. Also, the more words contained in a matching phrase, the more weight of the matching phrase the similarity rate will be considered.

Back to FIG. 4, distance measurement unit 113 of computing device 10 measures distances between two subsequent matching phrases in reference electronic document 142 and first electronic document 104, respectively. Second proximity parameter calculating unit 114 obtains second proximity parameter 20 based on the distance(s) measured by distance measurement unit 113.

The distance between subsequent matching phrases is measured by counting how many phrases existed between two subsequent matching phrases, like the following example:

{ matching phrase text ... text ... text { matching phrase
←—————————————————→
distance between phrases According to the disclosed embodiments, distance measuring unit 113 measures the distances between subsequent matching phrases in reference electronic document 142 and first electronic document 104A, respectively. If these two documents consist of long texts with only two matching phrases, there will be only one second proximity parameter 20 and a value of the second proximity parameter will depend on how close these two matching phrases are.

In the embodiment of FIG. 5, for example, if the distance A ($D_A$) between the two matching phrases 502 and 504 in document A is 10 words and the distance B ($D_B$) between the two matching phrases 502' and 504' in document B is 80 words, the second proximity parameter 20 may be calculated as a ratio of 10 and 80, i.e., ⅛ based on the following equation.

$$\text{Second proximity parameter } AB = \frac{D_A}{D_B} \quad (2)$$

First proximity parameters 10 and second proximity parameter 20 will be considered by similarity rate calculating unit 115 to calculate and obtain a similarity rate between reference electronic document 142 and first electronic document 104A, as shown in FIG. 4. The similarity rate may be expressed as a numerical value in a range of 0-100%. In accordance with the preferred embodiments, similarity rate calculating unit 115 will consider several parameters to take account of the similarity rate. These parameters may include the number of matching phrases, the lengths of the matching phrases, the first proximity parameters, and the second proximity parameters, as expressed below.

$$SimRate = f\begin{pmatrix} NumberOfMatchPhrases, \\ LengthsOfMatchPhrases, \\ FirstProximityParameter, \\ SecondProximityParameter \end{pmatrix}$$

As described above, in the example of FIG. 5, a first proximity parameter for the first pair of matching phrases 502-502' is 0.75, and the length (the number of words) of each matching phrase is 4 (words). A first proximity parameter for the second pair of matching phrases 504-504' is 1 and the length thereof is 3 (words). Also, the second proximity parameters (i.e., the ratio of the distances between two matching phrases 502 and 504 in document A and between two matching phrases 502' and 504' in document B) is ⅛. Based on these values, the similarity rate between document A and document B can be obtained by the following equation:

SimRate $AB$=sum of [(length*first proximity parameter) of each matching pair]+sum of [second proximity parameter of each pair of subsequent matching phrases] (3)

Thus, the similarity rate between document A and B is 4*0.75+3*1+⅛, which can be deemed as 6.125%.

Please note that equations (1)-(3) as shown above are illustrated for exemplary purposes only. Other mathematical operations which can obtain relative values of the matching words in each matching phrase and the distances between subsequent matching phrases between a primary/reference electronic document and an electronic document to be compared with the primary/reference electronic document can also be used without limitation.

In accordance with the disclosed embodiments, the user may further select electronic documents which have desired similarity rates in relation to document A (e.g., a reference electronic document such as document 142) through user interface 130 or input device 140. For example, the user may choose to select all documents that have similarity rates of 75% and up in relation to document A. In this scenario, document B will be ignored as its similarity rate is only 6.125%. Computing device 110 would compare next document, such as second electronic document 104B of FIG. 5, to obtain a similarity rate of second electronic document 104B in relation to reference electronic document 142. If the similarity rate of second electronic document 104B is 75% or up, second electronic document 104B will be displayed on output device 150. In the preferred disclosed embodiments, all of the electronic documents of which the similarity rates in relation to reference electronic document 142 may be displayed as a list of documents on output device 150. By selecting documents, the documents may be displayed on output device 150 for a user's review. The user may also choose to output desired documents to printing device 160 for being printed out.

Figure 6:
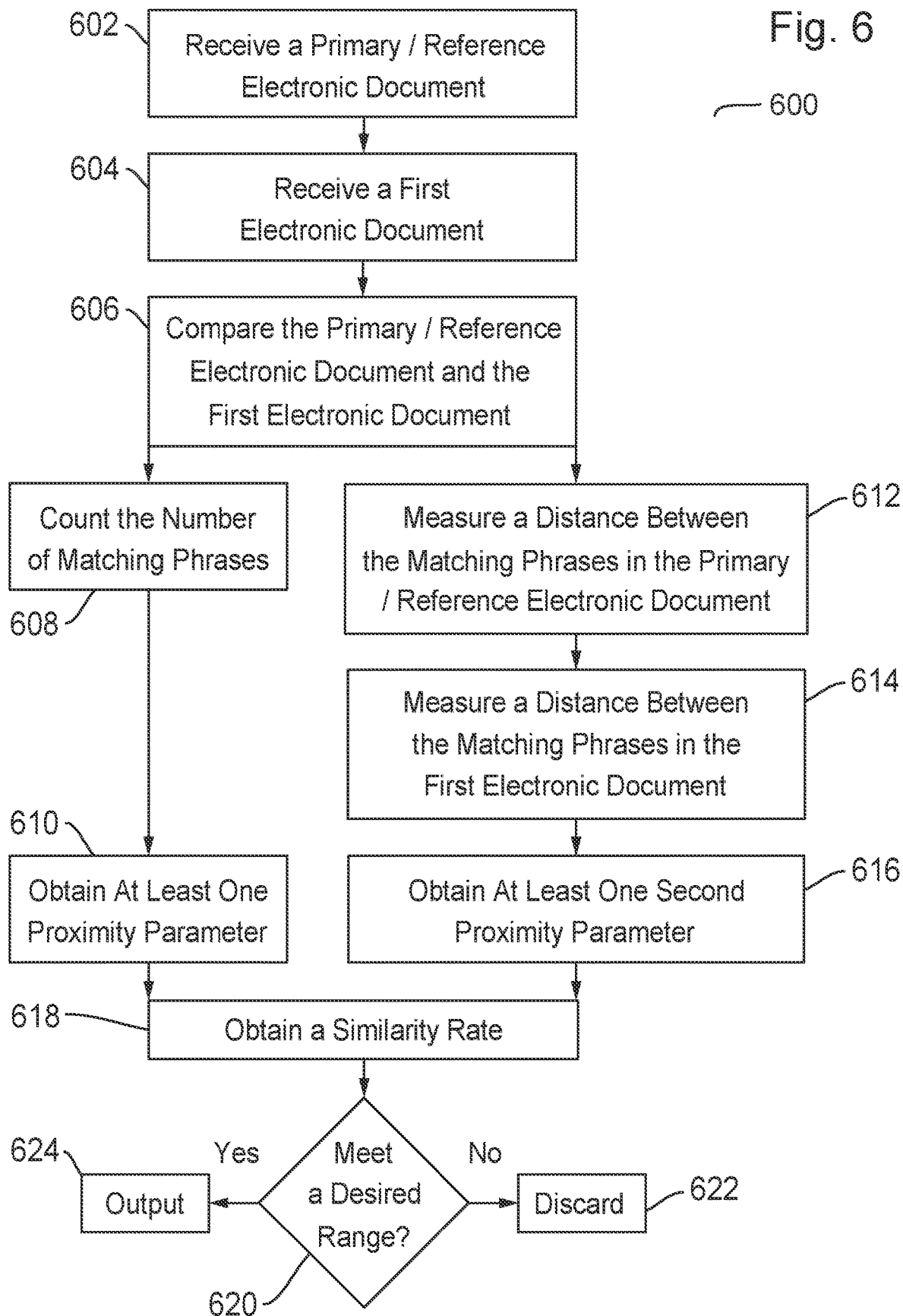
FIG. 6 shows a flowchart for obtaining a similarity rate between two electronic documents according to the disclosed embodiments.

FIG. 6 illustrates a flowchart 600 for obtaining a similarity rate between electronic documents in accordance with the disclosed embodiments. In FIG. 6, only two documents are compared for exemplary purpose. The process of FIG. 6 can continue until all input electronic documents are compared.

Step 602 executes by receiving a reference electronic document at similarity rate calculating system 200. The reference electronic document may be a scanned document received from printing device 160 or an electronic document retrieved from a document storage, e.g., document storage 102 in FIG. 1.

Step 604 executes by receiving a first electronic document that is to be compared with the reference electronic document. The first electronic document may also be a scanned document received from printing device 160 or an electronic document stored in document storage 102.

Step 606 executes by computing device 110 comparing the reference electronic document with the first electronic document.

Step 608 executes by counting the number of matching phrases between the reference electronic document and the first electronic document. The matching phrases between the two documents may include exactly-matched phrases and partial-matched phrases and contain same number of words (length of a matching phrase).

Step 610 executes by counting matched words in the matching phrases and calculating a ratio of the number of matched words with the length of the matching phrase to obtain a first proximity parameter. In some cases, there would be more than one matching phrases. When more than one matching phrase occurs, step 610 executes by calculating a respective first proximity parameter for respective matching phrases.

In addition to counting the number of matching phrases, step 612 further executes by measuring distances between subsequent matching phrases in the reference electronic document. Step 614 also executes by measuring distances between subsequent matching phrases in the first electronic document. These steps are important for deciding the similarity rate because the distances between subsequent matching phrases may be very close in one document, but very far in the other document. Taking the distances into account, the similarity rate can be obtained more accurately.

Next, step 616 executes by calculating at least one second proximity parameter based on the measured distances. In accordance with the disclosed embodiments, the second proximity parameter may be obtained by a ratio of the measured distance in the reference electronic document and the measured distance in the first electronic document. For example, if the distance in the reference electronic document is 10 and the distance in the first electronic document is 80, the second proximity parameter will be ⅛. Other mathematical operations to determine the relationship of the measure distances in the reference electronic document and the first electronic document can also be applied to obtain at least one second proximity parameter. It is noted that when there are more than two matching phrases between the reference electronic document and the first electronic document, there will be more than one second proximity parameter.

Next, step 618 executes by calculating the similarity rate of the first electronic document in relation to the reference electronic document based on the first and second proximity parameters obtained in steps 610 and 614. The calculation of the similarity rate may be referred to the above-mentioned equation (3).

In alternative disclosed embodiments, after the similarity rate is obtained, the user may enter a prompt to determine whether the first electronic document meets a search criterion. For example, the user may enter instructions to review the first electronic document if the similarity rate thereof is at or above a desire range. Thus, step 620 executes by determining if the similarity rate obtained in step 618 meets the desired range. If Yes, the first electronic document will be displayed at an output device or outputted in step 624. If No, the first electronic document will be discarded in step 622.

If needed, process 600 may repeat steps 604-624 to calculate a similarity rate for a second electronic document. Process 600 continues until all inputted electronic documents are compared.

The system and method in accordance with the disclosed embodiments obtain similarity rates between electronic documents based on the number of matching phrases and the distances between subsequent matching phrases. The similarity rates can be useful in searching electronic documents that have similar styles and meanings to a primary document. As a database may store thousands of documents, it may be time-consuming to compare all stored documents with a primary electronic document when using the similarity rate as one of searching criteria. Thus, the disclosed embodiments may focus only on business documents (e.g., accounting, legal documents, etc.) or documents in specific categories to limit the number of compared documents. The disclosed embodiments may also limit to compare only first pages of the documents, or a portion of documents that are considered important.

Alternatively, if the system and method of the disclosed embodiment are used to compare structural documents, in which each field of the documents can be defined by its name and value (i.e., key-value pairs,) the similarity rate can be calculated for each field separately. The total similarity rate will then be determined based on the number of the fields and the sizes thereof. For example, a field "SHIP TO" can be defined as a text string with 512 characters (words) and a filed "DESCRIPTION" may have a much longer size, e.g., 4K byte. These sizes will be taken in account when calculating similarity rates of both the "SHIP TO" field and the field "DESCRIPTION".

In some cases where documents with different types and structures are compared, for example, an invoice versus a travel report, a user may enter user instructions to map fields between two types of documents before comparing the fields.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more content management systems coupled to a network capable of exchanging information and data. Various functions and components of the content management system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A computer-implemented method for obtaining a similarity rate between two electronic documents using a computing device, comprising:
    receiving a first electronic document from an input device as a reference electronic document;
    receiving instructions, through the input device, wherein the instructions include searching electronic documents, via a search engine, of which similarity rates in relation to the reference electronic document meet a predetermined range;
    comparing the first electronic document with a second electronic document received from the search engine;
    counting a number of matching phrases between the first and the second electronic documents, wherein the matching phrases include exactly-matched phrases and similarly-matched phrases, and wherein the similarly-match phrases have a same length and include at last one matched word;
    measuring at least one distance between subsequent matching phrases among the matching phrases in each of the first electronic document and the second electronic document, respectively;
    determining a first proximity parameter for each respective matching phrase among the matching phrases, wherein each respective matching phrase has one corresponding first proximity parameter, and wherein the corresponding first proximity parameter is determined by a number of matched words within the respective matching phrase;
    obtaining at least one second proximity parameter based on the at least one measured distance of the matching phrases in the first and the second electronic documents;
    obtaining the similarity rate by summing up products of each of the first proximity parameters and a corresponding length of the respective matching phrase, plus the at least one second proximity parameter; and
    outputting the second document if the similarity rate of the second document in relation to the first document meets the predetermined range.

2. The computer-implemented method of claim 1, further comprising normalizing the count of matching phrases based on a total length of the first electronic document and a total length of the second electronic document.

3. The computer-implemented method of claim 1, wherein the first proximity parameter is determined by a percentage of the matched words within the length of the respective matching phrase.

4. The computer-implemented method of claim 1, wherein the at least one second proximity parameter is obtained by a ratio of the at least one measured distance between the subsequent matching phrases in the first electronic document and the at least one measured distance between the subsequent matching phrases in the second electronic document.

5. The computer-implemented method of claim 4, further comprising calculating a similarity rate for each group and summing up the similarity rate of each group to obtain a total similarity rate between the first and second electronic documents.

6. The computer-implemented method of claim 1, wherein the matching phrases include one or more group of matching phrases, each of which has a different length.

7. A system for obtaining similarity rates between electronic documents, comprising:
    a computing device comprising an input device configured to receive instructions, the instructions including obtaining similarity rates between a reference electronic document and a plurality of electronic document,
    the input device receiving the reference electronic document and an electronic document received from a search engine;
    the computing device including a processor and having medium-readable programs which when executed, causes the processor to access the plurality of electronic documents stored in at least one database, to compare the plurality of electronic documents with the reference electronic document to obtain the similarity rates of the plurality of electronic documents in relation to the reference electronic document, and to retrieve at least one electronic document of which the similarity rate in relation to the reference electronic document meets a predetermined range and
    wherein the processor is configured to obtain a similarity rate of an individual electronic document of the plurality of electronic documents in relation to the reference electronic document by
    count a number of matching phrases between the reference electronic document and the individual electronic document, wherein the matching phrases include exactly-matched phrases and similarly-matched phrases, and wherein the similarly-matched phrases have a same length and include at last one matched word;
    measure at least one distance, respectively, between subsequent matching phrases among the matching phrases in the reference electronic document and in the individual electronic document, wherein the number of the at least one distance is 1 less than the number of the matching phrases;
    obtain at least one first proximity parameter for the matching phrases of the individual electronic document, wherein each respective matching phrase among the matching phrases has one corresponding first proximity parameter, and wherein the corresponding first proximity parameter is determined by a number of matched words within the respective matching phrase;
    obtain at least one second proximity parameter, each of which is calculated based on the measured at least one distance between the subsequent matching phrases in the reference electronic document and the measured at least one distance between the subsequent matching phrases in the individual electronic document; and
    obtain the similarity rate of the individual electronic document in relation to the reference electronic document, wherein the similarity rate is calculated by summing up products of each of the first proximity parameters and a corresponding length of the respective matching phrase, plus a sum the at least one second proximity parameter.

8. The system of claim 7, wherein the processor is further configured to normalize the count of matching phrases based on a total length of the reference electronic document and a total length of the individual electronic document.

9. The system of claim 7, wherein each of the first proximity parameters is determined by a percentage of the matched words within the length of the respective matching phrase.

10. The system of claim 7, wherein each of the at least one second proximity parameters is a ratio of the at least one measured distance between the subsequent matching phrases in the reference electronic document and the at least one measured distance between the subsequent matching phrases in the individual electronic document.

11. The system of claim 7, wherein the matched phrases include one or more than one group of matching phrases, each of which have a different length.

12. The system of claim 11, wherein the similarity rate is calculated by obtaining a similarity rate for each group of matching phrases and summing up the similarity rate of each group to obtain a total similarity rate between the reference electronic document and the individual electronic document.

13. The system of claim 7, further comprises a user interface for receiving instructions to search electronic documents each of which a similarity rate in relation to the reference electronic document are within the predetermined range.

14. The system of claim 7, wherein the output device is one or both of a display screen and a printing device.

15. A computer-implemented method for obtaining a plurality of electronic documents, using a computing device, similar to a reference electronic document, the computer-implemented method comprising:
receiving a first electronic document from an input device as the reference electronic document;
receiving user instructions from a user interface, the user instructions including searching electronic documents, via a search engine, of which similarity rates in relation to the reference electronic document is within a predetermined range;
comparing the reference electronic document with an electronic document received from the search engine to determine the similarity rate of the electronic document in relation to the reference electronic document;
counting a number of matching phrases between the reference electronic document and the electronic documents, wherein the matching phrases include exactly-matched phrases and similarly-matched phrases, and wherein the similarly-match phrases have same lengths and include at last one matched word;
measuring distances between subsequent matching phrases among the matching phrases in the electronic document and in the reference electronic document, respectively;
obtaining at least one first proximity parameter, each of which corresponding to one of the matching phrases, wherein the at least one first proximity parameter reflects a ratio of a number of matched words and a length of words of the corresponding matching phrase;
obtaining at least one second proximity parameter based on the measured distances between the subsequent matching phrases in the reference electronic document and the electronic document, wherein the at least one second proximity parameter reflects a ratio of each of the measured distance between the subsequent matching phrases in the reference electronic document and each of the measured distance between the subsequent matching phrases in the electronic document; and
obtaining the similarity rate by summing up products of the at least one first proximity parameter and the length of the corresponding matching phrase for all matching phrases, plus the at least one second proximity parameter; and
outputting the electronic document if the similarity rate thereof in relation to the reference electronic document fall within the predetermined range.

16. The computer-implemented method of claim 15, wherein the matching phrases include one or more group of matching phrases, each of which has a different length.

17. The computer-implemented method of claim 16, further comprising calculating a similarity rate for each group and summing up the similarity rate of each group to obtain a total similarity rate between the reference electronic document and the electronic document.

* * * * *